Sept. 3, 1963 H. GANG 3,102,688
SIMULTANEOUS TENS TRANSFER AND FUGITIVE ONE MECHANISMS
Filed Feb. 2, 1960 3 Sheets-Sheet 1

INVENTOR.
HERMAN GANG
BY
ATTORNEY

Sept. 3, 1963          H. GANG          3,102,688
SIMULTANEOUS TENS TRANSFER AND FUGITIVE ONE MECHANISMS
Filed Feb. 2, 1960                                3 Sheets-Sheet 2

INVENTOR.
HERMAN GANG
BY
George V. Hall
ATTORNEY

Sept. 3, 1963               H. GANG               3,102,688
SIMULTANEOUS TENS TRANSFER AND FUGITIVE ONE MECHANISMS
Filed Feb. 2, 1960                             3 Sheets-Sheet 3
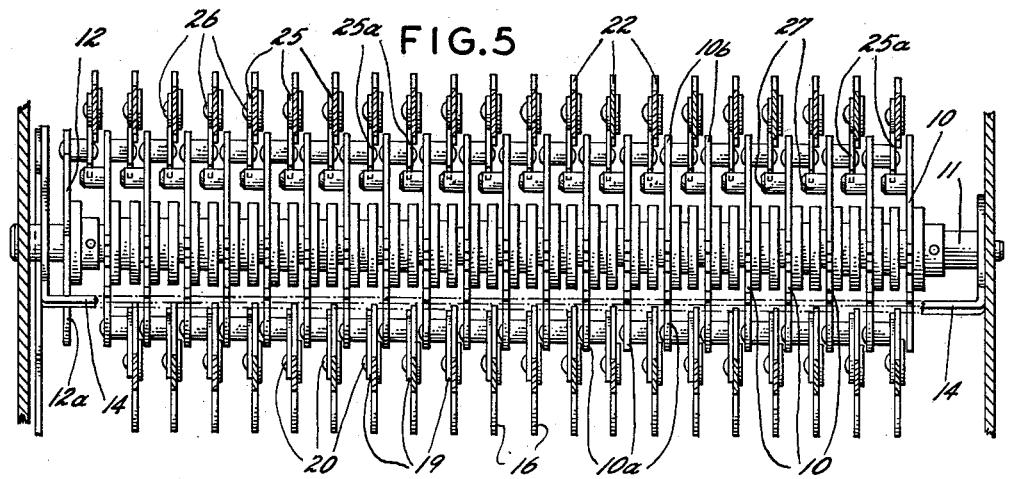
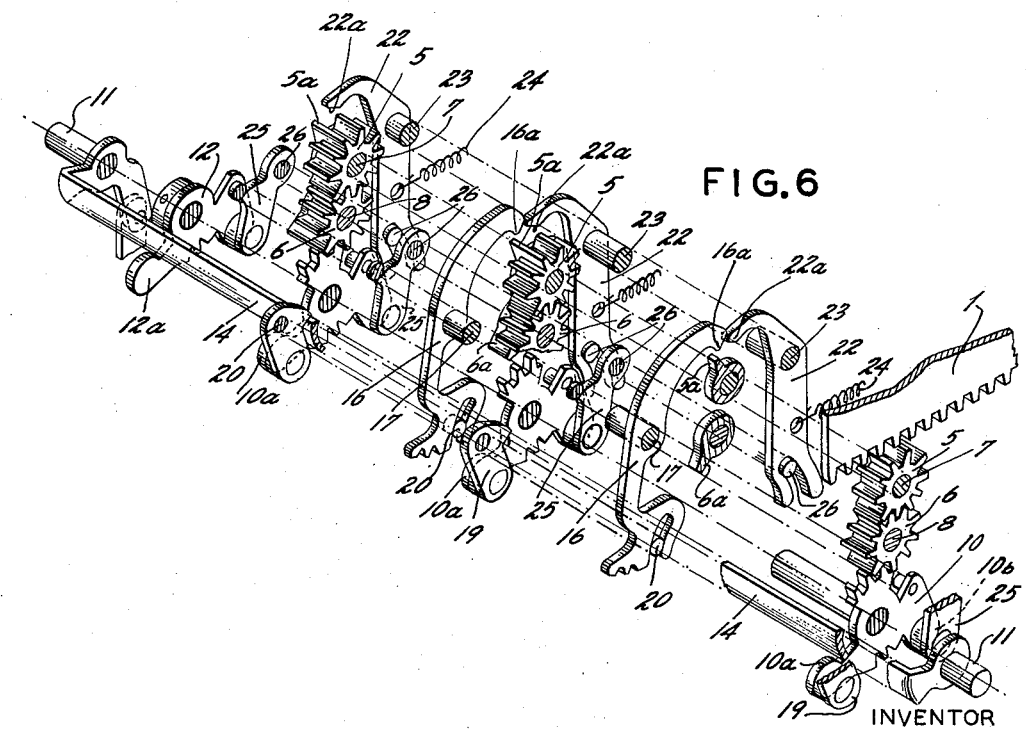
INVENTOR
HERMAN GANG
BY
George V. Hall
ATTORNEY

3,102,688
SIMULTANEOUS TENS TRANSFER AND FUGITIVE ONE MECHANISMS
Herman Gang, Morris Plains, N.J., assignor to Monroe Calculating Machine Company, Orange, N.J., a corporation of Delaware
Filed Feb. 2, 1960, Ser. No. 6,284
7 Claims. (Cl. 235—137)

This invention relates to tens transfer mechanisms for calculating machine registers and particularly to means for effecting simultaneous tens transfer in two or more successive orders of a register.

After a register wheel moves through 9 in additive registration or through 0 in subtractive registration, tens transfer mechanism is operable to add or to subtract respectively one unit in the next higher order register wheel. This may appropriately be termed a primary transfer operation.

If each of a series of register wheels stands at 9 in additive registration and the next lower order wheel is moved additively through 9, the transfer mechanism is operable to move each of the wheels of the series to 0 and to add one unit to the next higher order wheel. Conversely if each of a series of the wheels stand at 0 and the next lower order wheel is moved subtractively through 0, the transfer mechanism is operable to move each of the wheels of the series to 9 and to subtract one unit from the next higher order wheel. The transfer operations are usually effected successively from lower to higher orders, as in a wave, the transfer mechanism being conditioned by a transfer in one order to effect a transfer in the next higher order. A transfer in a higher order resulting from a transfer in the next lower order may appropriately be termed a secondary transfer.

The successive secondary transfer operations are necessarily extended through a good portion of a machine cycle and are therefore time consuming and are a major factor in limiting machine speed. It is therefore obviously desirable to effect simultaneously all transfer operations occurring in a machine cycle.

It is accordingly a main object of the invention to provide an improved simultaneous transfer mechanism.

Another object of the invention is to provide a simultaneous transfer mechanism which is rapid and particularly positive in operation.

A further and important object of the invention is to provide a transfer mechanism wherein the transfer actuators are simultaneously driven directly by a common operating member.

Another object of the invention is to provide a fugitive one mechanism operable in conjunction with the transfer mechanism and having a minimum number of parts of simple construction.

Other objects and advantages of the invention will be evident from the following description of a preferred embodiment thereof with reference to the accompanying drawings in which:

FIG. 5 is a horizontal section taken on line 5—5 of FIG. 3.

FIG. 6 is a fragmentary exploded perspective of a plurality of orders of the register and the associated transfer mechanism.

Figure 1:
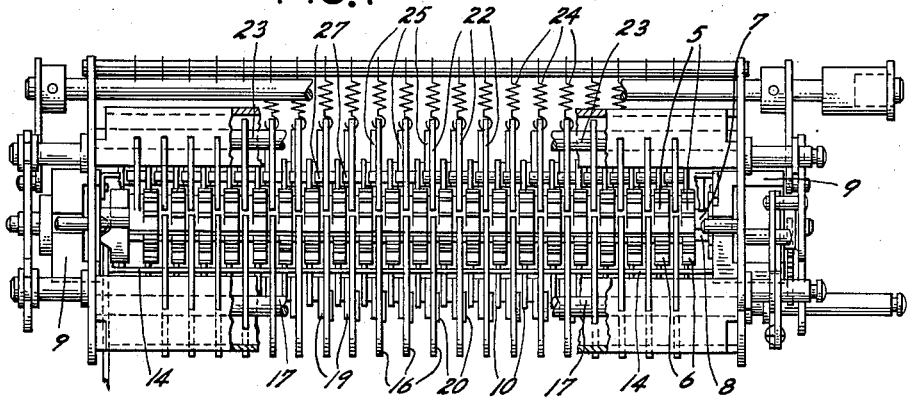
FIG. 1 is a plan view of a register embodying the invention with parts broken away.
Figure 2:
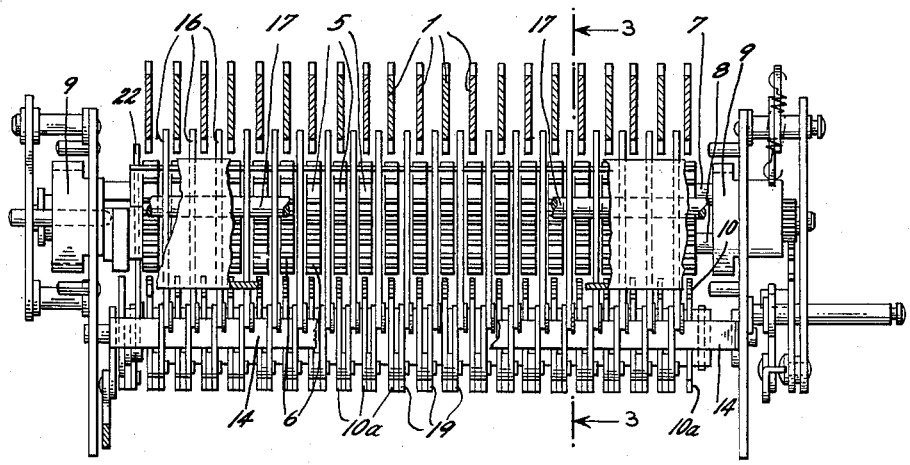
FIG. 2 is a front elevation of the register and parts of FIG. 1 with parts in section and broken away.

The calculating machine in which the invention is embodied may be either the ten key or the full keyboard type. The machine includes an ordinal series of digital actuator racks 1 which are normally held toward the left (FIGS. 3, 4) against the tension of springs 2 by a restoring bail 3. During each machine cycle, bail 3 is moved toward the right in a forward stroke and then restored in a return stroke. Cyclically operable drive means and means operable thereby for imparting forward and return strokes to bail 3 and other mechanisms in timed relationship as later described are well known in the art, and it is therefore considered unnecessary to show and describe such means.

During the forward stroke of bail 3, springs 2 move actuator racks 1 toward the right in forward excursions until they are arrested in positions corresponding to the values of depressed keys of associated key columns in a full keyboard machine, or in positions corresponding to the settings of the columns of a selector carriage of a machine of the ten key type. During its return stroke, bail 3 engages racks 1 in their respective forward positions and restores them to their normal leftmost position.

The register is of the well-known algebraic type wherein a set of add pinions 5 are intermeshed with a set of subtract pinions 6. Pinions 5 and 6 are mounted respectively on shafts 7 and 8 which are supported by a cradle comprising a pair of end plates 9. When add pinions 5 stand at normal cleared 0 position, subtract pinions 6 stand at the complemental 9 position. Either set of pinions 5 or 6 may be in position for engagement with racks 1 and upon reversing of cradle 9 through 180° the opposed set of intermeshed pinions will be brought into position for engagement with the racks.

Normally register 5—6 is in an intermediate position out of engagement with digital actuator racks 1 and opposed tens transfer actuators 10 later described. Racks 1 move idly in their forward excursions and then cradle 9 is moved upwardly to engage either add gears 5 or subtract gears 6 with said racks. Thus during their return strokes, racks 1 will enter the selected values into register 5—6. This arrangement provides that when gears 5 are engaged for additive registration, subtract gears 6 will be rotated reversely to register the 9's complement, and that subtraction is effected by additive registration to the complemental registration in subtract gears 6 thereby rotating add gears 5 subtractively.

After digital registration, register 5—6 is moved from engagement with racks 1 and engaged with actuators 10 for tens transfer registration. After completion of the transfer operation, the register is restored to its normal intermediate position thereby completing a cycle of registration.

Tens transfer actuators 10 are in the form of gear segments mounted on a shaft 11 below register pinions 5, 6. There is a segment 10 for each ordinal pair of pinions 5, 6 and all except the lowest order segment is loosely mounted for rocking movement on shaft 11.

The lowest order segment 10 (FIG. 5) is fixed on shaft 11 which is rockably mounted in the machine framing. Furthermore, a transfer member 12 (FIGS. 5, 6) is fixed on shaft 11 to the left of the highest order segment 10. Transfer member 12 does not directly effect transfer registration but operates to rock shaft 11 thereby rocking the lowest order segment 10 in a fugitive one operation later described.

Each transfer gear segment 10 includes a leftwardly extending arm 10a (FIGS. 3, 4, 6) and transfer member 12 includes a like arm 12a. A bail 14 extends transversely above arms 10a, 12a. Normally, bail 14 is held counterclockwise engaging the upper edges of arms 10a, 12a thereby holding segments 10 and member 12 counterclockwise. In transfer operations, segments 10 and member 12 are adapted to be rocked from the normal counterclockwise position of FIGS. 3, 6 to the clockwise position of FIG. 4 and then restored. A transversely disposed coil spring 15 engaging suitable notches in the lower edges of segments 10 and member 12 detent these parts in normal counterclockwise and in clockwise operated position.

Upon passage of pinion 5 through 9 in additive registration or upon passage of the intermeshed pinion 6 through 9 in subtractive registration, means is conditioned to effect a primary transfer operation of transfer segment 10 of the next higher order register pinions 5, 6 by bail 14. This operation will be described below with particular reference to FIGS. 3, 4, 6. In FIG. 6 the three highest orders of pinions 5, 6 are shown. It will be noted that the highest order pinions 5, 6 comprise an overflow order; that is, digital registration is not effected in the highest order but only tens transfer registration from the next lower order. However, this highest order may condition transfer member 12 for a simultaneous operation with its transfer segment 10 in a fugitive one operation later described.

The conditioning means for a primary transfer operation includes an extension 5a to the left from a tooth of each pinion 5 and an extension 6a to the left from a tooth of each pinion 6. In the lowest order of exploded FIG. 6, the tooth extensions 5a, 6a are shown broken away and removed to the left from pinions 5, 6.

Associated with each order of pinions 5, 6, except the highest order, which does not transmit a primary transfer, is a primary conditioning lever 16. Levers 16 are substantially vertically disposed and are rockably mounted on a shaft 17 to the left (FIGS. 3, 4, 6) of register pinions 5, 6.

Figure 3:
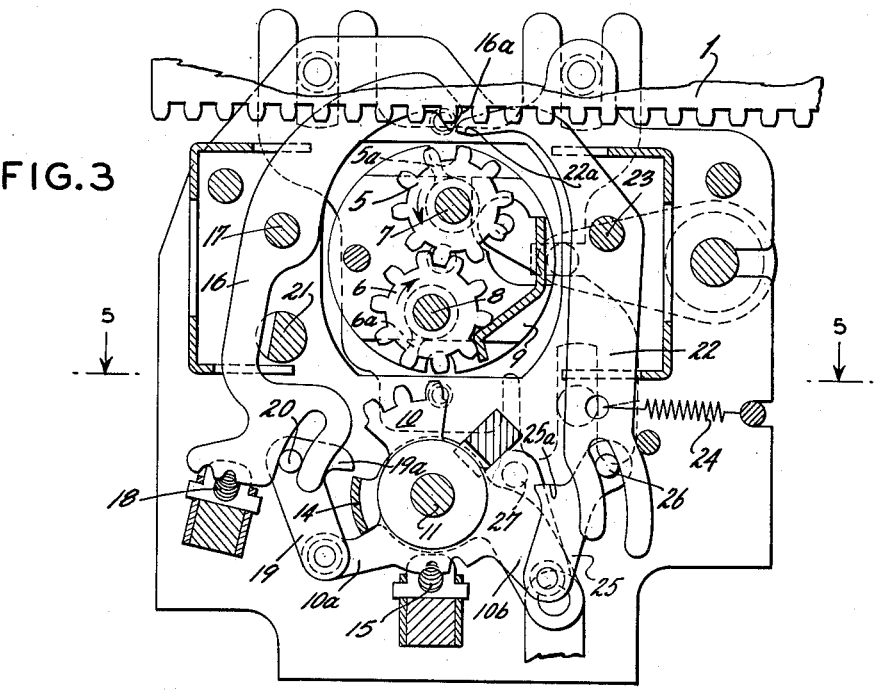
FIG. 3 is a vertical section taken on line 3—3 of FIG. 2 with the parts in normal position.

Levers 16 are normally in the clockwise position of FIGS. 3, 6. When in this position, a nose 16a at the upper end of each lever is in the path of movement of the tooth extension 5a or of 6a of the associated pinions 5, 6 when said pinions respectively are engaged with rack 1 for digital registration.

Figure 4:
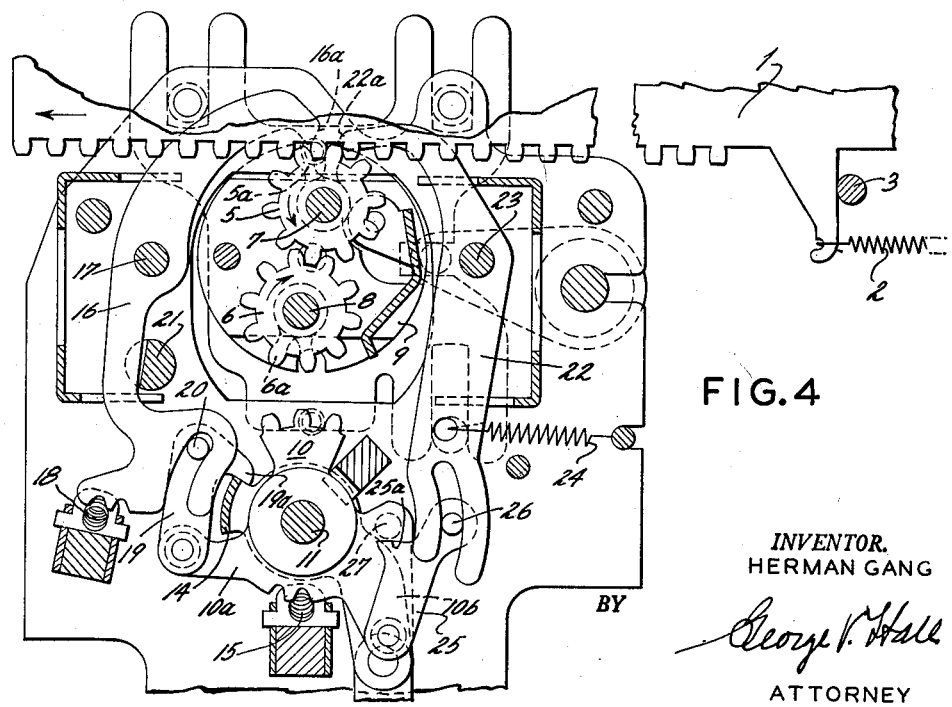
FIG. 4 is a section similar to FIG. 3 with the parts in an operated position.

Upon passage of pinion 5 or 6 through 9 registering position, tooth extension 5a or 6a will engage and pass beyond nose 16a thereby rocking lever 16 to the counterclockwise position of FIG. 4.

Detent means comprising a coil spring 18 engaging suitable notches at the lower ends of levers 16 locates said levers in either clockwise normal position or counterclockwise operated position.

An upstanding link 19 is pivotally mounted at its lower end to the end of arm 10a of each transfer gear segment 10 except the lowest order segment which is not operated in a primary transfer.

A pin 20 extends toward the right (FIG. 6) from the upper end of link 19 and engages an arcuate open end slot at the lower end of lever 16 of the next lower order pinions 5, 6. Thus when lever 16 is in normal clockwise position (FIGS. 3, 6), link 19 will be held counterclockwise.

When lever 16 and link 19 are in the normal positions, as described above, a rightwardly extending nose 19a at the upper end of link 19 is to the left and in a plane slightly above the upper edge of bail 14 as most clearly shown in FIG. 3. Therefore if lever 16 is rocked counterclockwise by a tooth extension 5a or 6a during digital registration, link 19 will be rocked clockwise to position its nose 19a immediately above the upper edge of bail 14 as shown in FIG. 4.

After the return effective digital registering strokes of racks 1 as indicated by the arrow (FIG. 4), bail 14 will be rocked clockwise to the position of FIG. 4 and then restored counterclockwise. In the clockwise movement of bail 14, its upper edge will engage nose 19a of link 19 thereby rocking the connected transfer gear segment 10 idly clockwise to the position of FIG. 4. While the parts are in this position, cradle 9 will be moved downwardly from the position of FIG. 4 to engage the associated pinion 5 or 6 with gear segment 10. Then during the return counterclockwise movement of bail 14, its lower edge will engage arm 10a of segment 10 thereby restoring said segment counterclockwise and entering one unit into the engaged register pinions 5, 6.

After bail 14 and segment 10 have been restored, cradle 9 will be moved upwardly to intermediate position to disengage pinion 5 or 6. Furthermore, a flat sided restore shaft 21 will be rocked to restore lever 16 and link 19. The flat side of shaft 21 extends transversely along the inner lower edges of levers 16. Therefore when shaft 21 is rocked, an edge of its flat side will engage operated lever 16 and restore it to the normal clockwise position of FIG. 3. Thus a cycle including digital and primary transfer registration is completed. Although a primary transfer operation in one order has been described, it will be obvious that bail 14 will simultaneously effect transfer operations in all orders wherein the transfer mechanism has been conditioned by digital registration in the respective next lower orders.

If a series of pinions 5 or 6 stand at 9 registering position and the next lower order pinion has passed through 9 registering position when racks 1 have been restored in registering operation, the lowest order pinion of the series will be moved to zero in a primary transfer operation, as described, and all of the higher order pinions of the series will be moved to 0 in secondary transfer operations. Furthermore, a secondary transfer operation will add one unit to the next higher order wheel from the series. As previously described, all of the transfer operations are effected simultaneously.

Associated with each order of pinions 5, 6 is a secondary conditioning lever 22. Levers 22 are substantially vertically disposed and are rockably mounted on a shaft 23 to the right (FIGS. 3, 4, 6) of register pinions 5, 6.

Levers 22 are normally held in the counterclockwise position of FIGS. 3, 6 by springs 24. A nose 22a at the upper end of each lever 22 is directly above tooth extension 5a or 6a if the associated pinion 5 or 6 stands at 9 registering position and is presented for engagement with rack 1. Consequently if engaged pinion 5 or 6 stands at 9 registering position when rack 1 has been restored in a registering operation, tooth extension 5a or 6a will be engaged with nose 22a of lever 22 thereby rocking and holding said lever in the clockwise position of FIG. 4.

An upstanding link 25 is pivotally mounted at its lower end to a right arm 10b of each transfer gear segment 10 except the lowest segment which is operated only in fugitive one operation later described.

A pin 26 extends toward the right (FIG. 6) from the upper end of link 25 and engages an arcuate open end slot at the lower end of lever 22 of the next lower order pinions 5, 6. Thus when lever 22 is in normal counterclockwise position (FIGS. 3, 6), link 25 will be held clockwise.

When lever 22 and link 25 are in the normal positions, as described above, a leftwardly extending nose 25a intermediate the ends of link 25 is to the right and in a plane slightly below a pin 27 which extends toward the left (FIG. 6) from arm 10b of segment 10 of lower order pinions 5, 6 with which lever 22 is associated as most clearly shown in FIG. 3. Therefore if lever 22 is rocked and held clockwise by a tooth extension 5a or 6a when rack 1 is restored, link 25 attached to the next higher order segment 10 will be rocked counterclockwise to position nose 25a immediately below pin 27 of the adjacent lower order segment 10 as shown in FIG. 4. It will be seen therefore that if lower order segment 10 is rocked clockwise by bail 14 in a primary transfer operation, pin 27 of said segment will engage nose 25a of link 25 of the next higher order segment 10 and simultaneously rock said higher order segment clockwise. Thus each successive higher order segment 10 may be entrained for clockwise movement with the next lower order segment.

It will be noted that an entrained series of segments 10 are all rocked simultaneously clockwise indirectly by bail 14 operating through a link 19 to rock the lowest order segment of the series in a primary transfer operation. The indirect drive, however, is not disadvantageous because the clockwise movement of segments 10 is an idle operation during which time pinions 5 or 6 remain engaged with racks 1.

When pinions 5, 6 are moved downwardly from engagement with racks 1 to engagement with segments 10, levers 22 are released and restored by springs 24. The couplings comprising pins 27 and links 25 between segments 10 therefore will be disengaged.

During its return counterclockwise movement, bail 14 will engage arms 10a of all segments 10 which have been rocked clockwise either in primary or secondary transfer operation. Consequently the segments will be directly and positively restored counterclockwise directly by bail 14 while said segments are engaged with pinions 5 or 6 for transfer registration. This is considered an important aspect of the invention as it precludes the possibility of accumulation of lost motion and overload of the parts.

If pinion 5 or 6 of the overflow order, i.e., the highest order (FIG. 6) stands at 9, the associated lever 22 will be rocked as previously described when the register pinions are raised. The associated transfer segment 10 and the transfer member 12 fixed on shaft 11 to the left thereof have therebetween adjustable drive transmission elements corresponding to and operating in accordance with the elements previously described in connection with an adjacent pair of segments 10. Therefore if highest order segment 10 is rocked clockwise in a transfer operation, transfer member 12, shaft 11 to which it is fixed and lowest order segment 10 fixed on the shaft will be likewise rocked. When bail 14 is restored counterclockwise it will engage an arm 12a on member 12 and arm 10a on lowest order segment 10 thereby restoring said member and segment with any other active segments. A fugitive one therefore will be entered in the lowest order pinions 5, 6.

The invention has been disclosed as operating in conjunction with an algebraic register. Obviously it is equally applicable for operation with registers of other types. Also it is obviously applicable for operation in registers operating with other than the decimal system. It will be understood therefore that the invention is to be restricted only as necessitated by the scope and spirit of the appended claims.

*Summary of Operation*

To illustrate the operation of both the primary and secondary transfer mechanisms, "1" is added to "999."

In the following description, it will be assumed that the value "999" stands in the three lowest orders of the register so that reference may be made to the "units order," "tens order" and etc.

When "1" is added to the "9" in the units order gears 5, 6, movement of the gears to "0" will rock the related lever 16 from the position of FIG. 3 to the position of FIG. 4 thereby rocking link 19 of the tens order actuator 10 to coupled position with respect to bail 14. Therefore when bail 14 is rocked clockwise link 19 will likewise rock the tens order actuator 10.

Tens order gears 5, 6 stand at "9" and this will hold the related lever 22 in the clockwise position of FIG. 4. Tens order lever 22 is connected to link 25 of the hundreds order actuator 10 and will hold said link in the clockwise path of movement of pin 27 of the tens order actuator 10. Therefore clockwise movement of the tens order actuator will be transmitted to the hundreds order actuator. Because the hundreds order gears 5, 6 stand at "9," the clockwise movement will be transmitted to the thousands order actuator by the adjusted parts in the same manner as described above for transmission of the clockwise movement from the tens to the hundreds order.

The above operation is summarized as follows. Tens order actuator 10 is coupled to bail 14 for clockwise movement by link 19. Pin 27 of the tens order actuator transmits the clockwise movement to the hundreds order actuator through a link 25, and pin 27 of the hundreds order actuator transmits the clockwise movement to the thousands order actuator through a link 25. Accordingly the tens, hundreds and thousands order actuators 10 will be simultaneously rocked clockwise. After this gears 5, 6 will be engaged with the actuators which will be restored simultaneously counterclockwise by direct operation of bail 14 engaging arms 10a. Thus the simultaneous transfer will be registered and the gears will stand at "1000" registering position.

I claim:

1. In a register including an ordinal series of register wheels, a reciprocatory transfer actuator for each wheel, a common reciprocatory drive means for said actuators, normally disabled connecting means adjustable upon movement of each wheel from a first to a second given registering position to connect the actuator of the next higher order wheel to said drive means for a forward stroke in a primary transfer operation, said drive means thereupon being operable in a return stroke to restore said actuator independently of said connecting means, normally disabled drive transmission means between each pair of adjacent actuators operable during the forward stroke of operation of the lower order actuator of said pair to transmit like movement to the higher order actuator of said pair in a secondary transfer operation, said actuator drive means thereupon being operable to restore said pair of actuators simultaneously and each independently in a return stroke, and means operable when each wheel is in said first given registering position to enable the drive transmission means between its actuator and the actuator of the next higher order wheel.

2. In a register including an ordinal series of register wheels, a reciprocatory transfer actuator for each wheel, a common reciprocatory drive means for said actuators normally ineffectively operable in its forward stroke and normally operable in its return stroke to return all of said actuators simultaneously and each independently from their forward stroke positions, normally disconnected coupling means for connecting each actuator to said drive means for forward stroke operation therewith in a primary transfer operation, means operable upon movement of each wheel from a first to a second given registering position to connect the coupling means for the actuator of the next higher order wheel, normally disabled drive transmission means operable by each actuator in its forward stroke to impart forward stroke secondary transfer operation to the next higher order actuator, and means operable when each wheel is in said first given registering position to enable the drive transmission means to the actuator of the next higher order wheel.

3. In a register including an ordinal series of register wheels, a segmental transfer actuator rack for each wheel each rockable for forward and return stroke operation, a driving bail for said actuators normally ineffective in forward stroke operation to drive said actuators and normally effective in its return stroke to return all of said actuators simultaneously and each independently from their forward stroke positions, normally disconnected coupling means for connecting each actuator to said driving bail for forward stroke operation therewith in a primary transfer operation, means operable upon movement of each wheel from a first to a second given registering position to connect the coupling means for the actuator of the next higher order wheel, normally disabled drive transmission means operable by each actuator in its forward stroke to impart forward stroke secondary transfer operation to the next higher order actuator, and means operable when each wheel is in said first given registering position to enable the drive transmission means to the actuator of the next higher order wheel.

4. The invention according to claim 3 wherein said actuators are mounted on a rockable shaft.

5. The invention according to claim 4 in combination with fugitive one mechansim for entering one unit in the lowest order wheel under control of the highest order wheel, comprising provision for fixing the actuator of the lowest order wheel on said shaft and for loosely mounting the actuators of all higher order wheels on said shaft, a drive transmission member fixed on said shaft adjacent the actuator of said highest order wheel, a normally disabled drive transmission means operable by said actuator of said highest order wheel in its forward stroke to impart forward stroke transfer operation to said drive transmission member, means operable when said highest order wheel is in said first given registering position to enable said drive transmission means to said transmission member, and means operable by said bail in its return stroke to return said drive transmisison member.

6. In a register having an ordinal series of register wheels and a segmental transfer actuator rack for each wheel; fugitive one mechanism for entering one unit in the lowest order wheel under control of the highest order wheel, comprising a rockable shaft on which the actuator of said lowest order wheel is fixed and on which the actuators of all higher order wheels are rockably mounted, a drive transmission member fixed on said shaft adjacent the actuator of said highest order wheel, normally disabled drive transmission means operable by said actuator of said highest order wheel to rock said drive transmission member, and means operable when said highest order wheel is in a given registering position to enable said drive transmission means.

7. In a register including an ordinal series of register wheels, a segmental transfer actuator rack for each wheel each rockable for forward and return stroke operation and each having an arm extending outwardly therefrom, a bail extending transversely at one side of said arms normally ineffective in forward stroke operation to engage said arms and normally operable in its return stroke to engage said arms to return simultaneously all of said actuators from their forward stroke positions, a coupling member adjustably mounted on each of said arms normally out of the path of movement of said bail in its forward stroke operation and adjustable into said path to impart forward stroke primary transfer operation to the associated actuator, means operable upon movement of each wheel from a first to a second given registering position to adjust the coupling member for the actuator of the next higher order wheel into the forward path of movement of said bail, normally disabled drive transmission means operable by each actuator in its forward stroke to impart forward stroke secondary transfer operation to the next higher order actuator, and means operable when each wheel is in said first given registering position to enable the drive transmission means to the actuator of the next higher order wheel.

References Cited in the file of this patent
UNITED STATES PATENTS

| | | |
|---|---|---|
| 2,694,524 | Reynolds | Nov. 16, 1954 |
| 2,715,999 | Butler | Aug. 23, 1955 |
| 2,826,366 | Capellaro | Mar. 11, 1958 |
| 2,917,235 | Hecht | Dec. 15, 1959 |